(12) United States Patent
Nomura

(10) Patent No.: US 12,528,368 B2
(45) Date of Patent: Jan. 20, 2026

(54) ELECTRIC WORK MACHINE

(71) Applicant: Yanmar Holdings Co., Ltd., Osaka (JP)

(72) Inventor: Kotaro Nomura, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 323 days.

(21) Appl. No.: 18/133,511

(22) Filed: Apr. 11, 2023

(65) Prior Publication Data
US 2023/0339334 A1  Oct. 26, 2023

(30) Foreign Application Priority Data

Apr. 22, 2022 (JP) ................... 2022-070964

(51) Int. Cl.
| | |
|---|---|
| *B60K 1/04* | (2019.01) |
| *B60L 50/60* | (2019.01) |
| *B62D 33/06* | (2006.01) |
| *E02F 9/08* | (2006.01) |
| *E02F 9/16* | (2006.01) |
| *H02K 11/00* | (2016.01) |

(52) U.S. Cl.
CPC ............... *B60L 50/66* (2019.02); *B60K 1/04* (2013.01); *B62D 33/0617* (2013.01); *E02F 9/0858* (2013.01); *E02F 9/163* (2013.01); *H02K 11/0094* (2013.01); *B60K 2001/0416* (2013.01); *B60L 2200/40* (2013.01)

(58) Field of Classification Search
CPC . B60L 50/66; B60L 2200/40; B62D 33/0617; B60K 1/04; B60K 2001/0416; E02F 9/0858; E02F 9/163

USPC .......................................................... 180/5.1
See application file for complete search history.

(56) References Cited

U.S. PATENT DOCUMENTS

| | | | | |
|---|---|---|---|---|
| 6,189,636 B1* | 2/2001 | Kikukawa | ........... | H01M 50/271 180/68.5 |
| 7,374,004 B2* | 5/2008 | Kraimer | ................... | B60K 1/04 180/68.5 |
| 8,540,042 B2* | 9/2013 | Atarashi | ................. | B60L 58/26 180/68.5 |
| 8,631,890 B2* | 1/2014 | Noguchi | ................. | E02F 9/207 180/311 |
| 8,727,055 B2* | 5/2014 | Matsumura | .......... | B62D 21/186 180/68.5 |
| 8,919,465 B2* | 12/2014 | Takeo | ....................... | E02F 9/24 180/65.21 |
| 9,156,341 B2* | 10/2015 | Matsumura | ............. | B60L 50/51 |

(Continued)

FOREIGN PATENT DOCUMENTS

| | | |
|---|---|---|
| EP | 4079974 A2 | 10/2022 |
| JP | 2013023943 A | 2/2013 |

*Primary Examiner* — Hau V Phan
(74) *Attorney, Agent, or Firm* — Chris Mizumoto

(57) ABSTRACT

A hydraulic excavator as an electric work machine includes an electric motor, a plurality of battery units that store electric power to drive the electric motor, and a machine-body frame on which the electric motor and the plurality of battery units are mounted. The plurality of battery units are located in parallel in one direction and aligned in a direction perpendicular to the one direction in the machine-body frame. At least two of the plurality of battery units have end parts located by being shifted from each other in one direction, respectively.

10 Claims, 8 Drawing Sheets

(56) References Cited

U.S. PATENT DOCUMENTS

| | | | |
|---|---|---|---|
| 2009/0314557 A1* | 12/2009 | Takeuchi | B60K 1/04 180/65.1 |
| 2013/0078071 A1* | 3/2013 | Noguchi | B60K 1/04 414/719 |
| 2017/0170438 A1 | 6/2017 | Jansen et al. | |

* cited by examiner

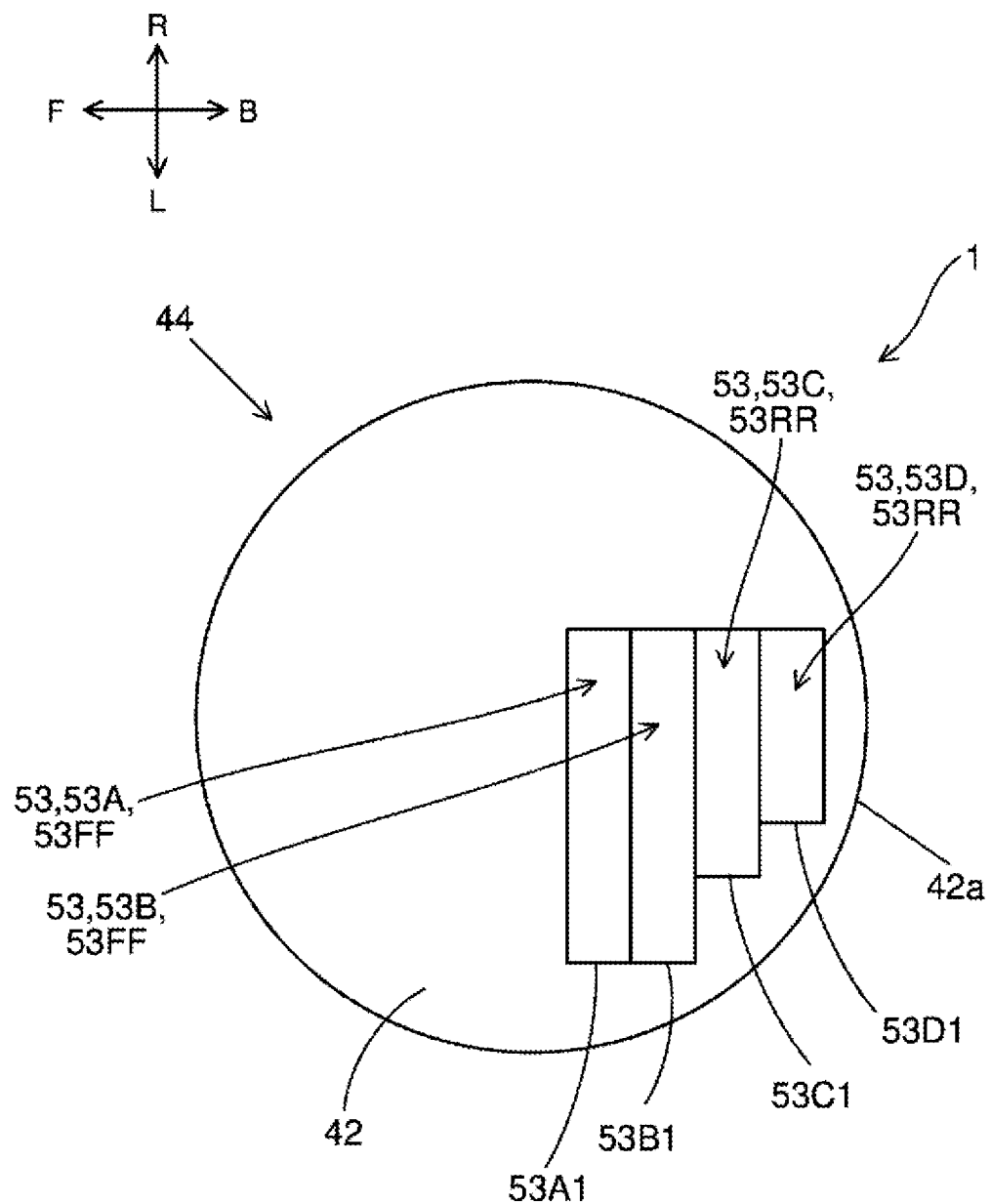

ELECTRIC WORK MACHINE

CROSS-REFERENCE

This application claims foreign priority of JP2022-070964 filed Apr. 22, 2022, the disclosures of which are hereby incorporated by reference in their entirety.

TECHNICAL FIELD

The present invention relates to an electric work machine.

BACKGROUND ART

Conventionally, revolving work machines including electric motors have been proposed. The electric motor is driven by electric power supplied from a battery unit. For example, Patent Document 1 discloses a revolving work machine in which two battery units and an electric motor are disposed by being aligned in a left-right direction on a rear part of a revolving platform.

PRIOR ART DOCUMENT

Patent Document

Patent Document 1: Japanese Unexamined Patent Application Publication No. 2021-080708

SUMMARY OF INVENTION

Technical Problem

In a revolving work machine, it is desirable that edge parts (particularly a rear end part of a machine body) of the revolving platform (machine-body frame) do not protrude as much as possible from a vehicle width when revolving in order to ensure safety in the rear at revolving. Thus, an outline of the edge part including the machine-body rear-end part of the machine-body frame is generally arc-shaped when viewed from above. In this regard, since the two battery units of the same size and the electric motor are disposed by being aligned in the left-right direction in Patent Document 1, the edge parts of the machine-body frame become angular, and there is a concern that the rear end part of the machine body protrudes from the vehicle width when revolving.

In addition, a small-sized revolving work machine has a small vehicle width. Thus, it is difficult to configure a revolving work machine with a small vehicle width in a configuration in which a plurality of battery units and an electric motor are disposed by being aligned in the left-right direction.

Therefore, in a configuration in which the plurality of battery units and the electric motor are mounted on the machine-body frame, it is desirable to increase a degree of freedom in layout of components including the plurality of battery units and the electric motor from viewpoints of enabling the edge part of the machine-body frame to be formed an arc shape and enabling a revolving work machine with a small vehicle width to be realized.

The present invention was made in order to solve the above-mentioned problems, and an object thereof is to provide an electric work machine capable of increasing the degree of freedom in layout of the components including the plurality of battery units and the electric motor.

Solution to Problem

An electric work machine according to an aspect of the present invention includes an electric motor, a plurality of battery units that store electric power to drive the electric motor, and a machine-body frame on which the electric motor and the plurality of battery units are mounted, and the plurality of battery units are located in parallel in one direction and aligned in a direction perpendicular to the one direction, and at least two of the plurality of battery units have respective end parts located by being shifted from each other in the one direction in the machine-body frame, respectively.

Advantageous Effects of Invention

According to the above configuration, the degree of freedom in layout of the components including the plurality of battery units and the electric motor can be increased.

BRIEF DESCRIPTION OF DRAWINGS

FIG. 8 is a plan view schematically showing another configuration of the above battery unit.

DESCRIPTION OF EMBODIMENTS

An embodiment of the present invention will be explained on the basis of drawings as follows.

1. Electric Work Machine

Figure 1:
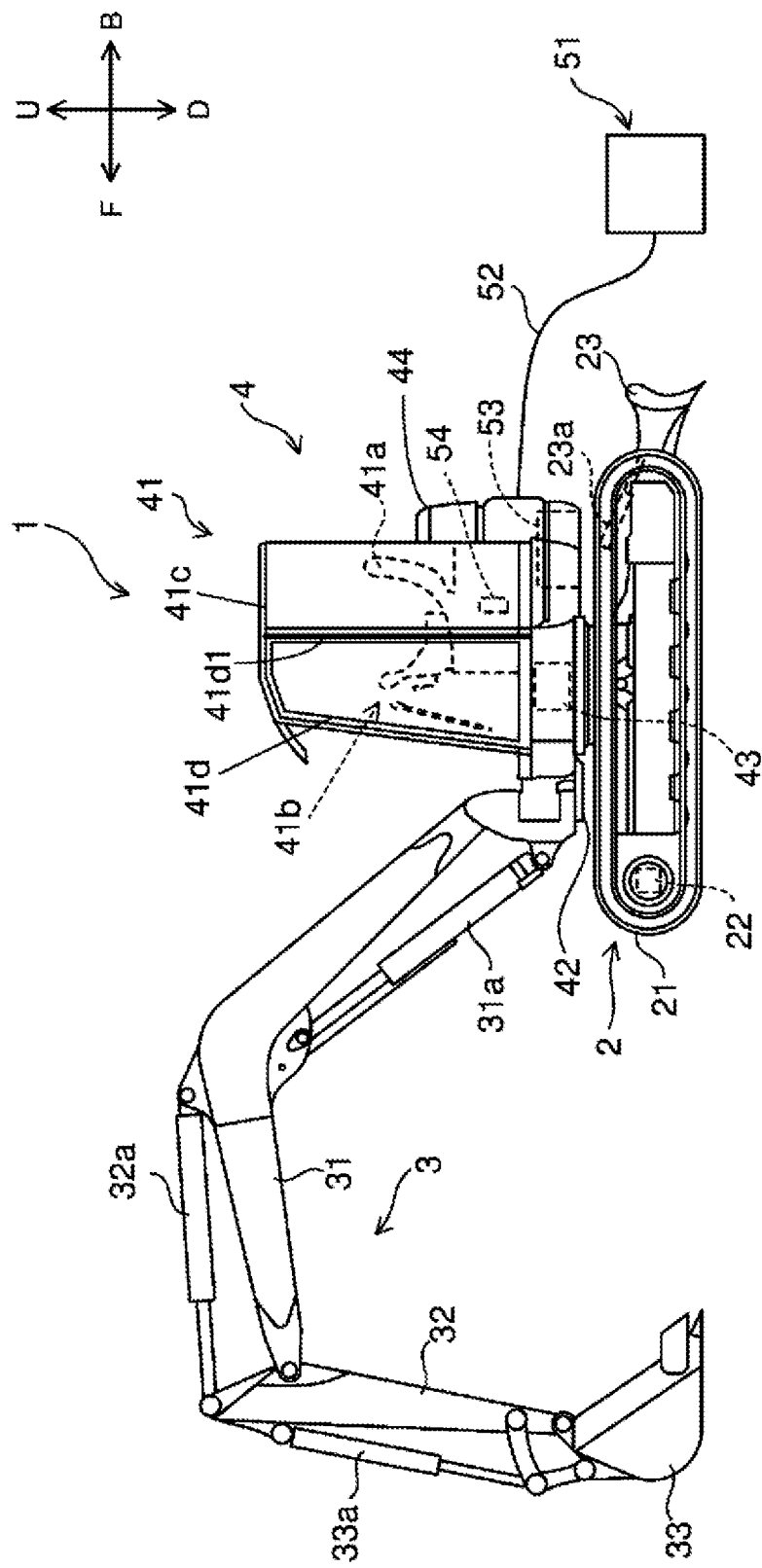
FIG. 1 is a side view showing a schematic configuration of a hydraulic excavator, which is an example of an electric work machine according to an embodiment of the present invention.

FIG. 1 is a side view showing a schematic configuration of a hydraulic excavator 1 (electric excavator), which is an example of an electric work machine, of this embodiment. The hydraulic excavator 1 includes a lower traveling body 2, a work machine 3, and an upper revolving body 4.

Here, directions are defined as follows. A direction in which an operator (manipulator, driver) sitting on a driver's seat 41a of the upper revolving body 4 faces front is referred to as forward, and an opposite direction thereof is referred to as backward. Therefore, when the upper revolving body 4 is in a non-revolving state (revolving angle 0°) relative to the lower traveling body 2, a front-back direction of the upper revolving body 4 matches the direction in which the lower traveling body 2 moves forward and backward. Also, the left side as viewed from the operator seated on the driver's seat 41a is referred to as "left" and the right side as "right". Moreover, a gravity direction perpendicular to the front-back direction and the right-left direction is defined as the up-down direction, with an upstream side of the gravity direction being "up" and a downstream side being "down." In the drawings, the hydraulic excavator 1 is shown with the upper revolving body 4 in a state of non-revolving relative to the lower traveling body 2. Also, in the drawings, forward is indicated by a symbol "F", backward by "B", rightward by "R", leftward by "L", upward by "U", and downward by "D" as necessary.

The lower traveling body 2 comprises a pair of left and right crawlers 21 and a pair of left and right traveling motors 22. Each of the traveling motors 22 is a hydraulic motor. The left and right traveling motors 22 drive the left and right crawlers 21, respectively, whereby the hydraulic excavator 1 can move forward and backward. On the lower traveling body 2, a blade 23 for performing a ground leveling work and a blade cylinder 23a are provided. The blade cylinder 23a is a hydraulic cylinder that rotates the blade 23 in the up-down direction.

The work machine 3 includes a boom 31, an arm 32, and a bucket 33. The boom 31, the arm 32, and the bucket 33 can be independently driven to perform excavation of earth and sand and the like.

The boom 31 is rotated by a boom cylinder 31a. The boom cylinder 31a has a base end part of supported by a front portion of the upper revolving body 4 and is movable in an extendable and retractable manner. The arm 32 is rotated by an arm cylinder 32a. The arm cylinder 32a has a base end part thereof supported by a distal end part of the boom 31 and is movable in the extendable and retractable manner. The bucket 33 is rotated by a bucket cylinder 33a. The bucket cylinder 33a has a base end part thereof supported by a distal end part of the arm 32 and is movable in the extendable and retractable manner. The boom cylinder 31a, the arm cylinder 32a, and the bucket cylinder 33a are constituted of hydraulic cylinders.

The upper revolving body 4 is located above the lower traveling body 2 and provided capable of revolving with respect to the lower traveling body 2 through a revolving bearing (not shown). In the upper revolving body 4, an operation portion 41, a revolving frame 42, a revolving motor 43, an engine room 44 and the like are disposed. The upper revolving body 4 is driven by the revolving motor 43, which is a hydraulic motor, to revolve through the revolving bearing. The hydraulic excavator 1 includes the revolving frame 42 as the machine-body frame.

A hydraulic pump 71 (see FIG. 2) is disposed on the upper revolving body 4. The hydraulic pump 71 is driven by an electric motor 61 (see FIG. 2) inside the engine room 44. The hydraulic pump 71 supplies hydraulic oil (pressure oil) to the hydraulic motors (the left and right traveling motors 22, the revolving motor 43, for example), and the hydraulic cylinders (the blade cylinder 23a, the boom cylinder 31a, the arm cylinder 32a, the bucket cylinder 33a, for example). The hydraulic motors and the hydraulic cylinders that are driven with the hydraulic oil supplied from the hydraulic pump 71 are collectively referred to as a hydraulic actuator 73 (see FIG. 2).

The operation portion 41 is installed on the revolving frame 42. The driver's seat 41a is disposed on the operation portion 41. Various levers 41b are disposed around the driver's seat 41a. When the operator sitting on the driver's seat 41a operates the lever 41b, the hydraulic actuator 73 is driven. This allows the lower traveling body 2 to travel, the blade 23 to perform the ground leveling work, the work machine 3 to perform an excavating work, and the upper revolving body 4 to revolve and the like.

The operation portion 41 has a cabin 41c. The cabin 41c covers the driver's seat 41a. As a result, the operator seated on the driver's seat 41a can be protected from a fall-down of the hydraulic excavator 1 or from adverse weather conditions. As described above, the hydraulic excavator 1 includes the operation portion 41.

And the operation portion 41 has the driver's seat 41a and the cabin 41c.

The cabin 41c has a door 41d. The door 41d has a rotating shaft 41d1. The rotating shaft axis 41d1 extends in a direction that intersects the flat-plate shaped revolving frame 42. In this embodiment, the rotating shaft 41d1 extends in an up-down direction. By rotating the door 41d around the rotating shaft 41d1 and by opening and closing it, the operator can get on and off the driver's seat 41a. The door 41d may be constituted by one piece or two pieces. In the case of a two-piece door configuration, each door is rotatably coupled to the other via a hinge.

A battery unit 53 is disposed on the upper revolving body 4. That is, the hydraulic excavator 1 includes the battery unit 53. The battery unit 53 is constituted by a lithium-ion battery unit, for example, and stores electric power to drive the electric motor 61. The battery unit 53 may be constituted by a plurality of batteries as a unit or may be constituted of a single battery cell. In this embodiment, the electric motor 61 and the plurality of battery units 53 described above are mounted on the revolving frame 42.

Moreover, in the upper revolving body 4, a power feed port, not shown, is provided. The power feed port described above and a commercial power supply 51 as an external power source are connected via a power feed cable 52. This allows the battery unit 53 to be charged.

In the upper revolving body 4, a lead battery 54 is further provided. The lead battery 54 outputs a low voltage (12 V, for example) direct-current voltage. The output from the lead battery 54 is supplied as a control voltage to, for example, a system controller 67 (see FIG. 2), a blower fan (not shown) and the like.

The hydraulic excavator 1 may be so configured that a hydraulic instrument such as a hydraulic actuator 73 and an electrically-driven actuator are used in combination. The electrically-driven actuators include, for example, an electric traveling motor, an electric cylinder, and an electric revolving motor.

2. Configurations of Electric System and Hydraulic System

Figure 2:
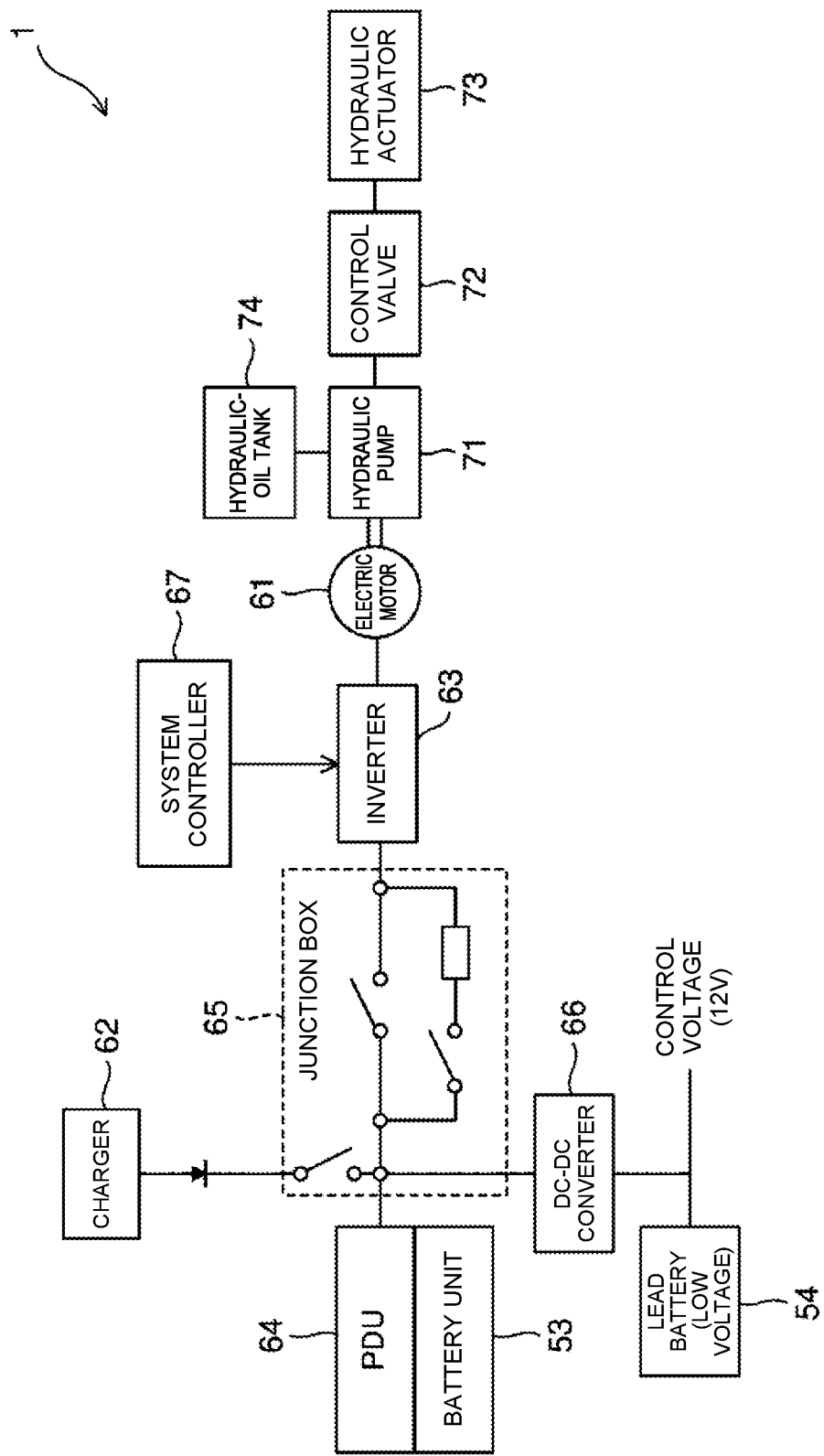
FIG. 2 is a block diagram schematically showing configurations of an electric system and a hydraulic system of the hydraulic excavator.

FIG. 2 is a block diagram schematically showing configurations of an electric system and a hydraulic system of the hydraulic excavator 1. The hydraulic excavator 1 includes the electric motor 61, a charger 62, an inverter 63, a PDU (Power Drive Unit) 64, a junction box 65, a DC-DC converter 66, and the system controller 67. The system controller 67 is constituted by an electronic control unit, also called an ECU (Electronic Control Unit) and electrically controls each portion of the hydraulic excavator 1.

The electric motor 61 is driven by electric power supplied from the battery unit 53 via the junction box 65 and the inverter 63. The electric motor 61 is constituted by a permanent magnet motor or an induction motor. The electric motor 61 is disposed on the revolving frame 42.

The charger 62 converts an AC voltage supplied from the commercial power supply 51 shown in FIG. 1 via the power feed cable 52 into a DC voltage. The inverter 63 converts the DC voltage supplied from the battery unit 53 into an AC voltage and supplies it to the electric motor 61. As a result, the electric motor 61 is rotated. The supply of the AC voltage (current) from the inverter 63 to the electric motor 61 is performed on the basis of a rotation instruction output from the system controller 67.

The PDU 64 is a battery control unit that controls input/output of the battery unit 53 by controlling a battery relay inside. The junction box 65 is configured by including a charger relay, an inverter relay, a fuse and the like. The voltage output from the charger 62 is supplied to the battery unit 53 through the junction box 65 and the PDU 64. Moreover, the voltage output from the battery unit 53 is supplied to the inverter 63 through the PDU 64 and the junction box 65.

The DC-DC converter 66 lowers a high-voltage (300 V, for example) direct-current voltage supplied from the battery unit 53 through the junction box 65 to a low voltage (12 V, for example). The voltage output from the DC-DC converter 66 is, similarly to the output from the lead battery 54, supplied to the system controller 67, the blower fan, and the like.

A plurality of the hydraulic pumps 71 are connected to a rotary shaft (output shaft) of the electric motor 61. The plurality of hydraulic pumps 71 include a variable-capacity pump and a fixed-capacity pump. FIG. 2 shows only one of the hydraulic pumps 71 as an example. Each hydraulic pump 71 is connected to a hydraulic-oil tank 74 that contains (stores) the hydraulic oil. The hydraulic pump 71 causes the hydraulic oil in the hydraulic-oil tank 74 to be supplied to the hydraulic actuator 73 through a control valve 72. As a result, the hydraulic actuator 73 is driven. The control valve 72 is a direction-switching valve that controls a flow direction and a flow rate of the hydraulic oil supplied to the hydraulic actuator 73.

3. Fixing and Disposition of Battery Unit

Figure 3:
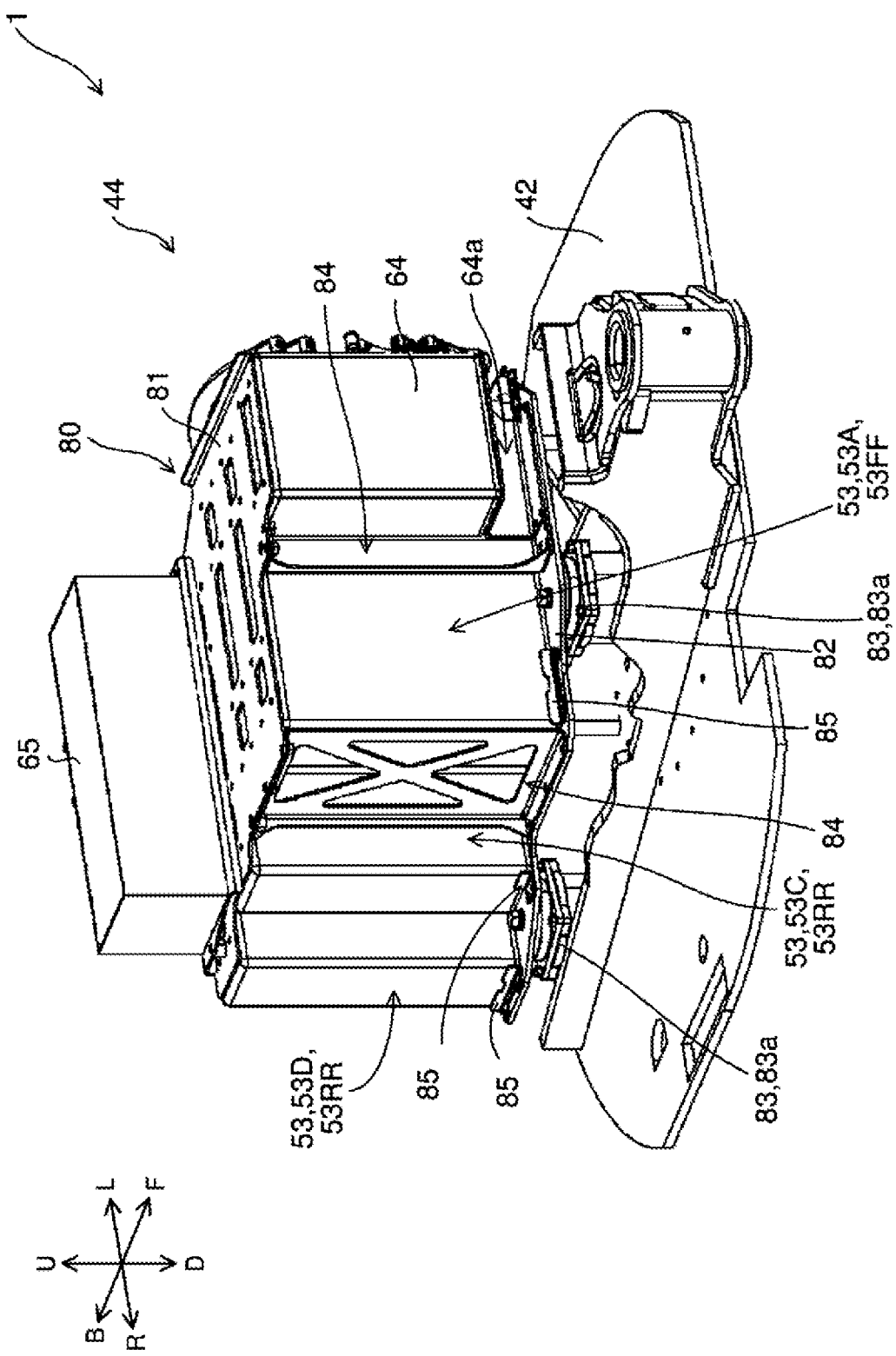
FIG. 3 is a perspective view of an inside of an engine room of the hydraulic excavator when viewed from diagonally front.
Figure 4:
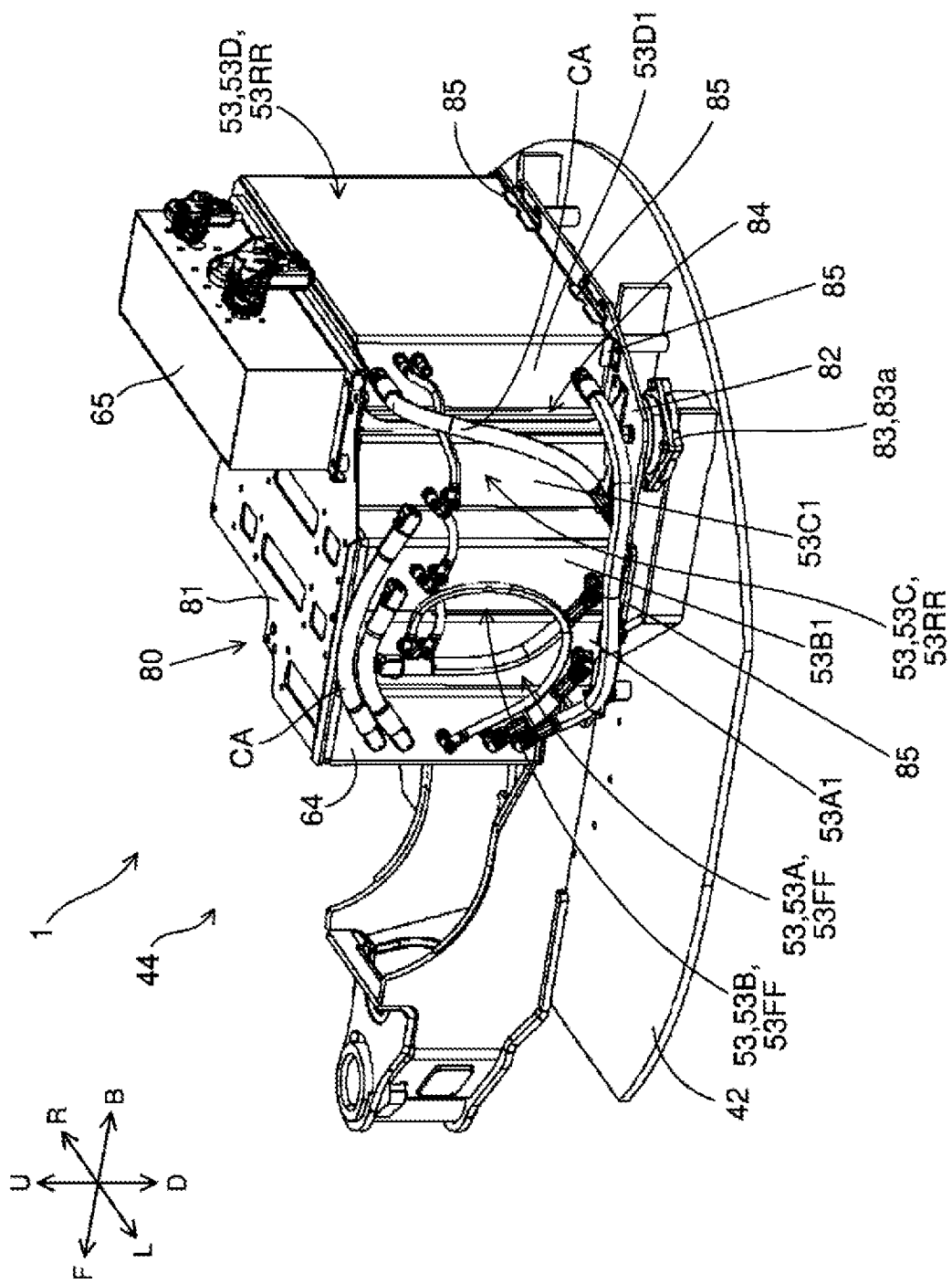
FIG. 4 is a perspective view of the inside of the engine room when viewed from diagonally rear.

Subsequently, a fixing mechanism of the battery unit 53 described above will be explained. FIG. 3 is a perspective view of an inside of the engine room 44 of the hydraulic excavator 1 when viewed from diagonally front. FIG. 4 is a perspective view of the inside of the engine room 44 when viewed from diagonally rear. As shown in these figures, the hydraulic excavator 1 includes a fixing mechanism 80. The fixing mechanism 80 is a mechanism that fixes the plurality of battery units 53 to the revolving frame 42.

The fixing mechanism 80 has an upper plate 81 as well as a lower plate 82 and a support portion 83. The upper plate 81 and the lower plate 82 sandwich the plurality of battery units 53 from the up-down direction. The support portion 83 supports the lower plate 82 on the revolving frame 42. Three pieces of the support portions 83 are provided on the revolving frame 42, for example, but the number of the support portions 83 is not particularly limited to three described above. The support portion 83 is constituted by including a vibration isolating member 83*a*. As the vibration isolating member 83*a*, a vibration-isolating structure combining vibration isolating rubber, a stay, a housing and the like can be used, for example.

The fixing mechanism 80 further has a coupling member 84. The coupling member 84 is coupled to the upper plate 81 and the lower plates 82 by bolts or the like. As a result, the upper plate 81 and the lower plate 82 are coupled via the coupling member 84. In this embodiment, three pieces of the coupling members 84 are provided, but the number of the coupling members 84 is not particularly limited.

The fixing mechanism 80 further has a positioning member 85. The positioning member 85 is fixed to the lower plate 82 (by a bolt, for example) and is located in contact with a bottom of any one of the plurality of battery units 53. The positioning member 85 reduces a risk of a positional shift of the battery unit 53 with respect to the lower plate 82.

The plurality of battery units 53 and PDU 64 are connected by a connecting cable CA. In particular, the plurality of battery units 53 are connected in series, parallel, or a combination of series and parallel.

Figure 5:
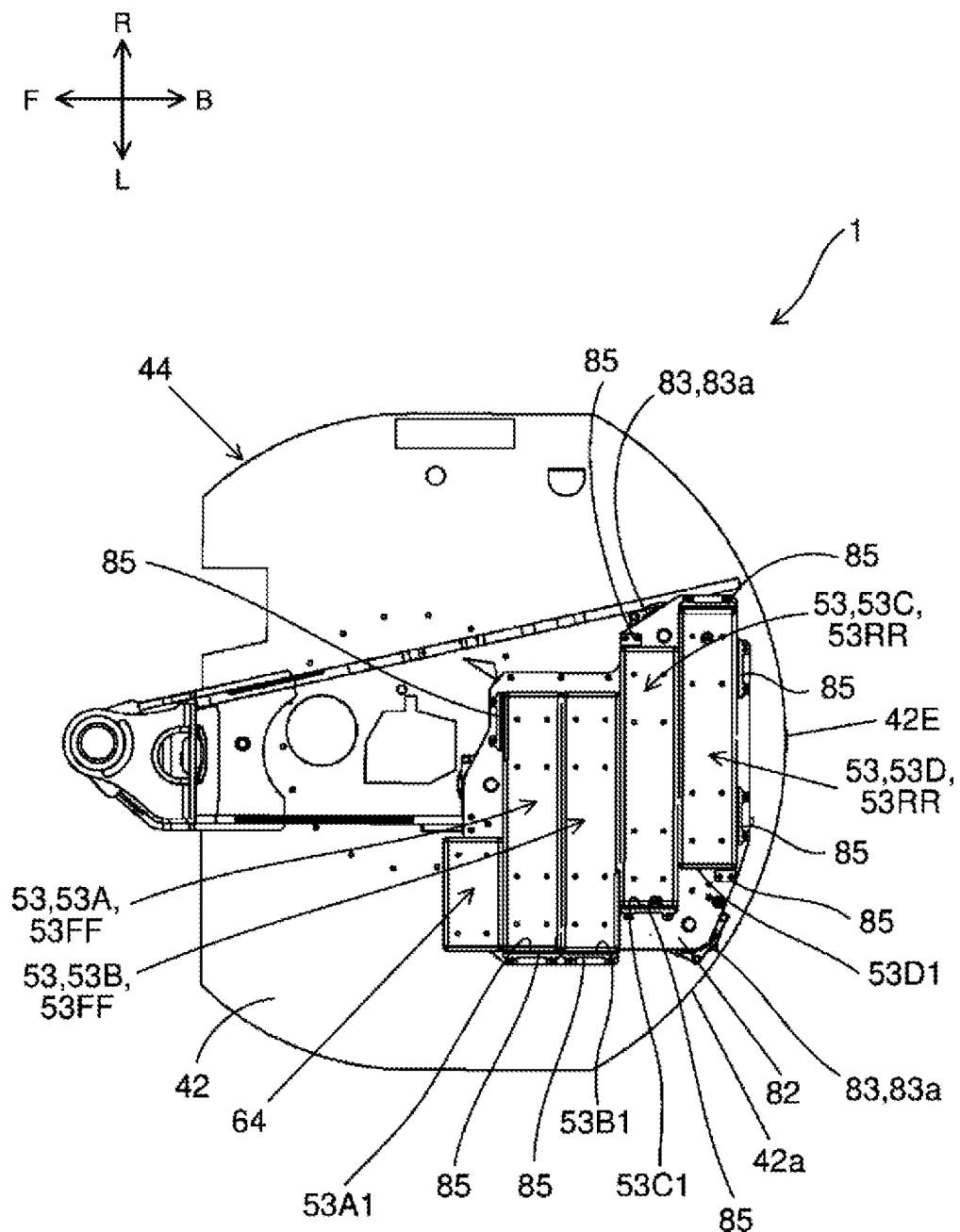
FIG. 5 is a plan view showing disposition of the battery unit on the lower plate.

FIG. 5 is a plan view showing the disposition of the battery unit 53 on the lower plate 82 in a state where the upper plate 81, the coupling member 84, and connecting cable CA are removed. Four units of the battery units 53 of the same size are disposed on the lower plate 82. For example, two units of the battery units 53 are connected in series so as to form one pair, and the other two battery units 53 are also connected in series so as to form one pair. Each pair is then connected in parallel with each other. The connection method of the four battery units is not limited to the above example. The number of the battery units 53 is not limited to four described above, either.

In this embodiment, the plurality of battery units 53 are located in parallel in one direction and aligned in a direction perpendicular to the one direction in the revolving frame 42 (on the lower plate 82). For example, the plurality of battery units 53 are located in parallel in the left-right direction as the one direction and aligned in the front-back direction perpendicular to the one direction in the revolving frame 42.

Here, when the above four battery units 53 are to be specifically distinguished, they are referred to as a first battery unit 53A, a second battery unit 53B, a third battery unit 53C, and a fourth battery unit 53D in order from front to back. The PDU 64 described above is located in front of the first battery unit 53A. A lower surface of the PDU 64 is fixed to a support stay 64*a* (see FIG. 3). The support stay 64*a* is fixed on the lower plate 82.

As shown in FIG. 5, the first battery unit 53A and the second battery unit 53B are disposed at the same position in the left-right direction (without being shifted from each other in the left-right direction) on the lower plate 82. The third battery unit 53C is disposed on the lower plate 82 by being shifted to the right more than the second battery unit 53B. The fourth battery unit 53D is disposed further shifted to the right on the lower plate 82 than the third battery unit 53C.

From this positional relationship of each of the battery units 53 as above, the following can be considered. That is, in the four battery units 53, the second battery unit 53B, the third battery unit 53C, and the fourth battery unit 53D have side end parts 53B1, 53C1, and 53D1, respectively, located by being shifted from each other in one direction (left-right direction, for example).

The number of battery units 53 having side end parts located by being shifted from each other in one direction is not limited to the above three (the second battery unit 53B, the third battery unit 53C, and the fourth battery unit 53D), but may be only two or four or more. In summary, it can be considered that, in this embodiment, at least two battery units 53 respectively have end parts located by being shifted from each other in one direction. In particular, it can be considered that at least two battery units 53 respectively have the side end parts (53C1, 53D1, for example) located by being shifted from each other in the left-right direction as the end parts described above.

According to the disposition of each battery unit 53 described above, even when the edge part 42*a* of the revolving frame 42 is formed having an arc-shape when viewed from above, as shown in FIG. 5, each battery unit 53 can be disposed so as to be substantially in line with the arc-shaped edge part 42a. The electric motor 61 (see FIG. 2) can then be disposed in an available space of the revolving frame 42 (on the right side of the first battery unit 53A and the second battery unit 53B, for example). Therefore, such a state can be avoided that the edge parts have angular shapes as in the conventional configuration in which the plurality of battery units and the electric motor are aligned in order in the left-right direction. Thus, the risk that the edge part 42a of the revolving frame 42 (in particular, the rear end part 42E of the machine-body in FIG. 5) protrudes from the vehicle width when revolving can be reduced.

Figure 6:
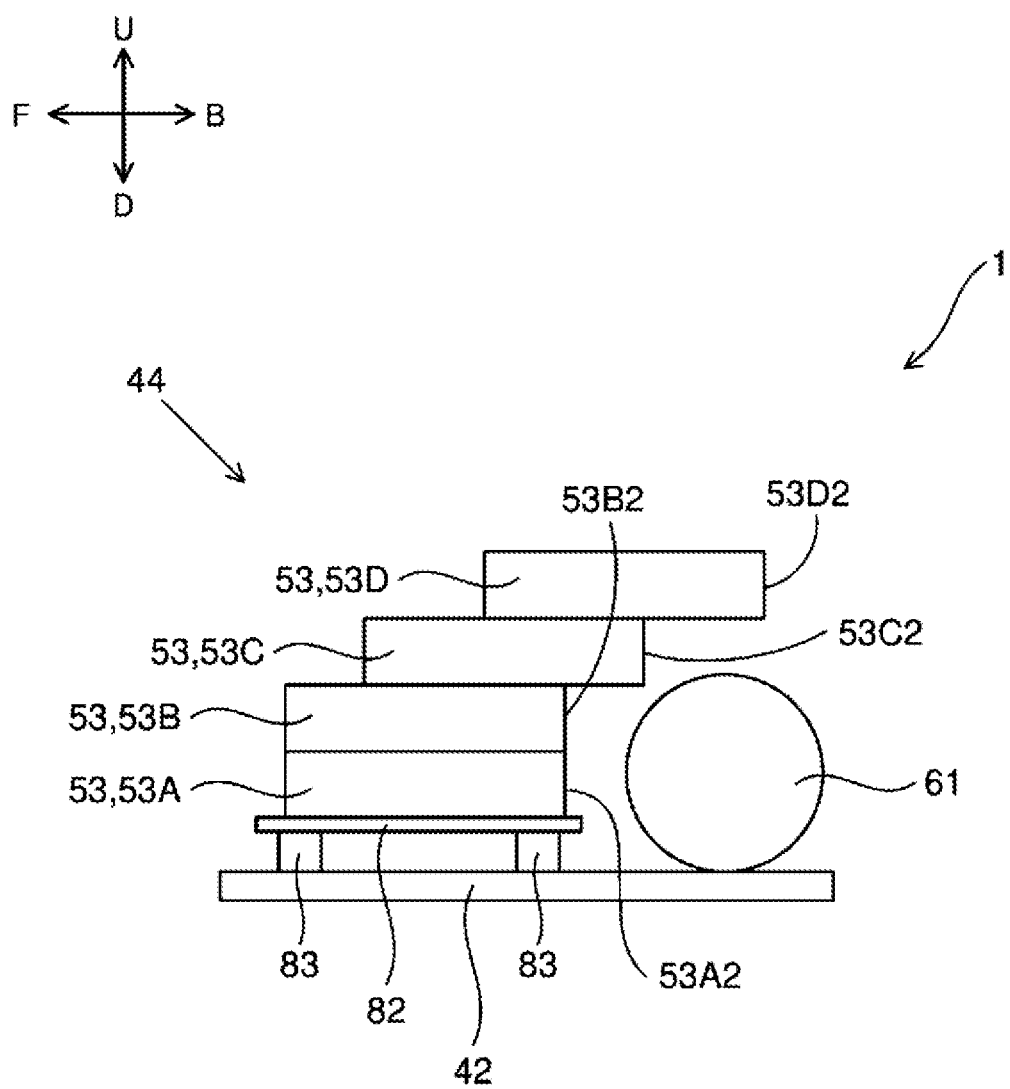
FIG. 6 is a side view schematically showing another disposition of the battery unit.

FIG. 6 is a side view schematically showing another disposition of the plurality of battery units 53. As shown in the figure, the plurality of battery units 53 may be located, in the revolving frame 42 (on the lower plate 82), in parallel in the front-back direction as one direction and aligned in the up-down direction perpendicular to the one direction. For example, the figure shows an example in which the first battery unit 53A, the second battery unit 53B, the third battery unit 53C, and the fourth battery unit 53D are stacked in this order from bottom to top.

A rear end part 53A2 of the first battery unit 53A and a rear end part 53B2 of the second battery unit 53B are aligned at the same position in the front-back direction. A rear end part 53C2 of the third battery unit 53C is located by being shifted to the rear of the rear end part 53B2 of the second battery unit 53B. A rear end part 53D2 of the fourth battery unit 53D is located by being shifted to the farther rear of the rear end part 53C2 of the third battery unit 53C. With the disposition of each of the battery units 53 as above, such a layout can be realized that the electric motor 61 is disposed between the uppermost fourth battery unit 53D and the revolving frame 42 below it. As a result, the vehicle width can be made smaller as compared with the conventional configuration in which the plurality of battery units 53 and the electric motor 61 are disposed by being aligned in the left-right direction.

As described above, at least two of the plurality of battery units 53 have end parts (the side end parts 53C1 and 53D1 in FIG. 5 or the rear end parts 53C2 and 53D2 in FIG. 6, for example) located by being shifted from each other in one direction (the left-right direction or the front-back direction), respectively, various layouts of the components including the plurality of battery units 53 and the electric motor 61 can be realized. As a result, the degree of freedom in layout of the components can be increased.

In the configuration shown in FIGS. 3 to 5, that is, in the configuration in which the plurality of battery units 53 are located in parallel in the left-right direction and aligned in the front-back direction in the revolving frame 42, and at least two battery units 53 have side end parts (53C1, 53D1, for example) that are located by being shifted from each other in the left-right direction, respectively, from the viewpoint of easily realizing the disposition of each battery unit 53 so as to be in line with the arc-shaped edge part 42a of the revolving frame 42, the at least two battery units 53 located with the end parts shifted in one direction are preferably located as follows. In other words, assuming that n is an integer equal to or larger than 2 and the number of at least two battery units 53 described above is n, the at least two battery units 53 described above are located in line in the revolving frame 42 from the rearmost side to the nth toward the front.

Moreover, in this embodiment, as shown in FIG. 5, the revolving frame 42 has the edge part 42a, and the edge part 42a has a shape (arc shape) whose width in the left-right direction widens as it goes forward from the rear end part 42E of the machine body of the revolving frame 42, when viewed from above.

From the viewpoint of efficient loading of a plurality of battery units 53 in the revolving frame 42 in accordance with the arc shape of the edge part 42a (effective utilization of space) or particularly from the viewpoint of efficient loading of the plurality of battery units 53 in a limited space of the revolving frame 42 in the rear small-revolving type hydraulic excavator 1 having a small protruding width of the edge part 42a from the vehicle width during revolving, the above at least two battery units 53 whose side end parts are located by being shifted in the left-right direction are preferably located as follows. That is, in the above at least two battery units 53, the side end part of the battery unit located relatively forward (the side end part 53C1 of the third battery unit 53C, for example) is located by being shifted to a side getting closer to the edge part 42a in the left-right direction with respect to the side end part of the battery unit located relatively rearward (the side end part 53D1 of the fourth battery unit 53D, for example).

When the above at least two battery units 53 whose side end parts are located by being shifted in the left-right direction are assumed to be rear battery units 53RR, the plurality of battery units 53 may have at least two front battery units 53FF located forward of the rear battery units 53RR. For example, if the third battery unit 53C and the fourth battery unit 53D are assumed to be the rear battery units 53RR, the first battery unit 53A and the second battery unit 53B are the front battery units 53FF. There may be three or more front battery units 53FF.

Figure 7:
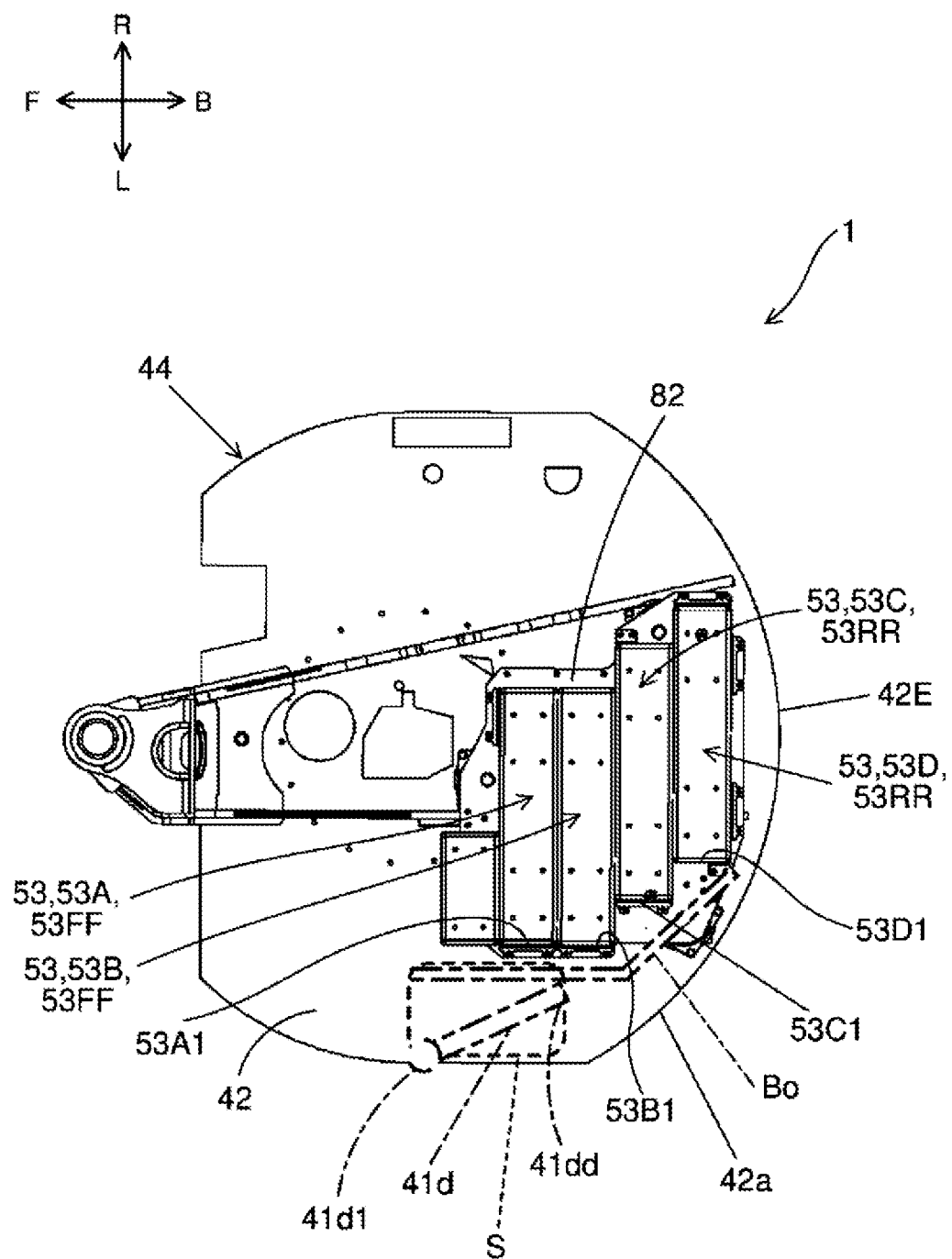
FIG. 7 is a plan view showing disposition of the above battery unit on the lower plate, together with a position of a cabin door in an open state.

FIG. 7 shows the plan view in FIG. 5 together with a position of the door 41d of the cabin 41c (see FIG. 1) in an open state. When a space S is ensured between the side end parts of the front battery units 53FF (53A1, 53B1, for example) and the edge part 42a of the revolving frame 42, viewed from above, the door 41d in the open state can be located in this space S. Moreover, an end part 41dd on a side opposite to the rotating shaft 41d1 of the door 41d can be fastened to a hood Bo located on the side of the battery unit 53 by a jig or the like so as to avoid flapping of the door 41d in the open state. In FIG. 7, the case in which the door 41d has a one-door configuration is shown, but if the door 41d has a two-door configuration, the door 41d is only shown in a bent state, indicated by a one-dot chain-line in FIG. 7.

As described above, from the viewpoint of ensuring the space S between the side end part of the front battery unit 53FF and the edge part 42a of the revolving frame 42 when viewed from above so as to effectively utilize this space S, at least two front battery units 53FF are preferably located as follows. That is, in at least two front battery units 53FF, the side end part of the battery unit located relatively forward (the side end part 53A1 of the first battery unit 53A, for example) is located at the same position in the left-right direction as the side end part of the battery unit located relatively rearward (the side end part 53B1 of the second battery unit 53B, for example).

In particular, in terms of reliably ensuring the space S described above, in the left-right direction, the rotating shaft 41d1 of the door 41d is preferably located by being separated from the side end parts of the at least two front battery units (the side end part 53A1 of the first battery unit 53A and the side end part 53B1 of the second battery unit 53B, for example) through the hood Bo.

By the way, as shown in FIG. 6, in such a configuration that a plurality of battery units 53 are located in parallel in the front-back direction as one direction and aligned in the up-down direction perpendicular to the one direction in the revolving frame 42, from the viewpoint of ensuring a disposition space for the electric motor 61, at least two of the plurality of battery units 53 (the third battery unit 53C and the fourth battery unit 53D, for example) preferably have rear end parts (rear end parts 53C2 and 53D2, for example) located by being shifted from each other in the front-back direction as end parts in the one direction (front-back direction), respectively.

At this time, from the viewpoint of reliably reducing the vehicle width of the hydraulic excavator 1 and of easily realizing the rear small-revolving type hydraulic excavator 1, the electric motor 61 is preferably located between the battery unit whose rear end part is located the most rearward (the fourth battery unit 53D, for example) and the revolving frame 42.

In the above, the case in which all the plurality of battery units 53 have the same length in one direction has been explained, but this configuration is not limiting. FIG. 8 is a plan view schematically showing another configuration of the battery unit 53. As shown in the figure, the plurality of battery units 53 may have the battery units 53 (the third battery unit 53C and the fourth battery unit 53D, for example) whose lengths in one direction (left-right direction, for example) are different from those of the other battery units 53 (the first battery unit 53A, the second battery unit 53B, for example). The battery units 53 with different lengths in one direction may be one or may be all. In other words, at least some of the plurality of battery units 53 may have different lengths in one direction. In this case, too, such a configuration that at least two of the plurality of battery units 53 have end parts (side end parts 53C1, 53D1, for example) located by being shifted from each other in one direction can be realized.

4. Appendices

The hydraulic excavator 1 described in this embodiment can also be expressed as an electric work machine as shown in the following Appendix.

An electric work machine of Appendix (1) includes an electric motor, a plurality of battery units that store electric power for driving the electric motor, and a machine-body frame on which the electric motor and the plurality of battery units are mounted, in which the plurality of battery units are located in parallel in one direction and aligned in a direction perpendicular to the one direction in the machine-body frame, and at least two of the plurality of battery units have respective end parts located by being shifted from each other in the one direction, respectively.

In the electric work machine of Appendix (2), in the electric work machine of Appendix (1), the plurality of battery units are located in parallel in the left-right direction as the one direction and aligned in the front-back direction perpendicular to the one direction in the machine-body frame, and the at least two battery units have side end parts as the end parts located by being shifted from each other in the left-right direction as the end parts, respectively.

In the electric work machine of Appendix (3), in the electric work machine of Appendix (2), assuming that n is an integer equal to or larger than 2 and the number of the at least two battery units is n, the at least two battery units are located in line in the machine-body frame from a rearmost side to the nth toward the front.

In the electric work machine of Appendix (4), in the electric work machine of Appendix (2) or (3), the machine-body frame has an edge part, and the edge part has a shape whose width in the left-right direction widens as it goes forward from a machine-body rear end part of the machine-body frame, when viewed from above, and in the at least two battery units, the side end part of the battery unit located relatively forward is located by being shifted to a side getting closer to the edge part in the left-right direction with respect to the side end part of the battery unit located relatively rearward.

In the electric work machine of Appendix (5), in the electric work machine of Appendix (4), when the at least two battery units are assumed to be the rear battery units, the plurality of battery units have at least two front battery units located forward of the rear battery units, and in the at least two front battery units, the side end parts of the battery units located relatively forward are located at the same position in the left-right direction as the side end parts of the battery units located relatively rearward.

The electric work machine of Appendix (6), in the electric work machine of Appendix (5), further includes an operation portion installed on the machine-body frame, the operation portion has a driver's seat and a cabin covering the driver's seat, the cabin has a door, the door has a rotating shaft extending in a direction that intersects the machine-body frame with a flat plate shape, and the rotating shaft of the door is located away from side end parts of the at least two front battery units through a hood in the left-right direction.

In the electric work machine of Appendix (7), in the electric work machine of Appendix (1), the plurality of batter units are located in parallel in a front-back direction as the one direction and aligned in an up-down direction perpendicular to the one direction in the machine-body frame, and at least two of the plurality of battery units have rear end parts located by being shifted from each other in the front-back direction as the end parts, respectively.

In the electric work machine of Appendix (8), in the electric work machine of Appendix (7), the electric motor is located between the battery unit whose rear end part is located the most rearward and the machine-body frame.

In the electric work machine of Appendix (9), in the electric work machine described in any one of Appendices (1) to (8), all the plurality of battery units have the same length in the one direction.

In the electric work machine of Appendix (10), in the electric work machine described in any one of Appendices (1) to (8), at least some of the plurality of battery units have different lengths in the one direction.

5. Supplemental Description

In this embodiment, it is assumed that one direction in which each of the battery units 53 is located in parallel is a left-right direction (see FIG. 5 and the like) or a front-back direction (see FIG. 6), but it may be a diagonal direction that intersects the left-right direction and the front-back direction.

The description has been made with the hydraulic excavator 1, which is a construction machine, as the example of the electric work machine, but the electric work machine is not limited to the hydraulic excavator 1 and may be any other construction machines such as a wheel loader. Also, the electric work machine may be an agricultural machine such as a combine harvester, a tractor or the like.

The embodiment of the present invention has been described above, but the scope of the present invention is not limited thereto, but can be worked with extension or modification within a range without departing from the gist of the invention.

INDUSTRIAL APPLICABILITY

The present invention is applicable to work machines such as a construction machine and an agricultural machine, for example.

REFERENCE SIGNS LIST

1 Hydraulic excavator (electric work machine)
41 Operation Portion
41a Driver's seat
41c Cabin
41d Door
41d1 Rotating shaft
42 Revolving frame (machine-body frame)
42a Edge part
42E Machine-body rear end part
53 Battery unit
53A First battery unit (battery unit, front battery unit)
53A1 Side end part (end part)
53A2 Rear end part (end part)
53B Second battery unit (battery unit, front battery unit)
53B1 Side end part (end part)
53B2 Rear end part (end part)
53C Third battery unit (battery unit, rear battery unit)
53C1 Side end part (end part)
53C2 Rear end part (end part)
53D Fourth battery unit (battery unit, rear battery unit)
53D1 Side end part (end part)
53D2 Rear end part (end part)
53FF Front battery unit
53RR Rear battery unit
61 Electric motor
Bo Hood

The invention claimed is:

1. An electric work machine comprising:
an electric motor;
a plurality of battery units that store electric power to drive the electric motor; and
a machine-body frame on which the electric motor and the plurality of battery units are mounted,
wherein
the plurality of battery units are located in parallel along one direction and aligned in a direction perpendicular to the one direction in the machine-body frame; and
at least two of the plurality of battery units have respective end parts located by being shifted from each other in the one direction
wherein
the plurality of battery units are positioned in parallel by one unit each along the one direction.

2. The electric work machine according to claim 1, wherein
the plurality of battery units are located in parallel in a front-back direction as the one direction and aligned in an up-down direction perpendicular to the one direction in the machine-body frame; and
the at least two of the plurality of battery units have rear end parts located by being shifted from each other in the front-back direction as the end parts, respectively.

3. The electric work machine according to claim 2, wherein
the electric motor is located between the battery unit whose rear end part is located the most rearward and the machine-body frame.

4. The electric work machine according to claim 1, wherein
all the plurality of battery units have the same length in the one direction.

5. The electric work machine according to claim 1, wherein
at least some of the plurality of battery units have different lengths in the one direction.

6. An electric work machine comprising:
an electric motor;
a plurality of battery units that store electric power to drive the electric motor; and
a machine-body frame on which the electric motor and the plurality of battery units are mounted,
wherein
the plurality of battery units are located in parallel in one direction and aligned in a direction perpendicular to the one direction in the machine-body frame; and
at least two of the plurality of battery units have respective end parts located by being shifted from each other in the one direction
wherein
the plurality of battery units are located in parallel in a left-right direction as the one direction and aligned in a front-back direction perpendicular to the one direction in the machine-body frame; and
the at least two battery units have side end parts located by being shifted from each other in the left-right direction as the end parts, respectively.

7. The electric work machine according to claim 6, wherein
assuming that n is an integer equal to or larger than 2 and the number of the at least two battery units is n;
the at least two battery units are located in line in the machine-body frame from a rearmost side to the n-th toward the front.

8. The work machine according to claim 6, wherein
the machine-body frame has an edge part, and the edge part has a shape whose width in the left-right direction widens as it goes forward from a machine-body rear end part of the machine-body frame, when viewed from above; and
in the at least two battery units, the side end part of the battery unit located relatively forward is located by being shifted to a side getting closer to the edge part in the left-right direction with respect to the side end part of the battery unit located relatively rearward.

9. The electric work machine according to claim 8, wherein
when the at least two battery units are assumed to be the rear battery units, the plurality of battery units have at least two front battery units located forward of the rear battery units; and
in the at least two front battery units, the side end parts of the battery units located relatively forward are located at the same position in the left-right direction as the side end parts of the battery units located relatively rearward.

10. The electric work machine according to claim 9, further comprising:
an operation portion installed on the machine-body frame, wherein the operation portion has a driver's seat and a cabin covering the driver's seat;

the cabin has a door; and the door has a rotating shaft extending in a direction intersecting the machine-body frame with a flat plate shape, and the rotating shaft of the door is located away from side end parts of the at least two front battery units through a hood in the left-right direction.

* * * * *